US011284360B1

United States Patent
Wu et al.

(10) Patent No.: US 11,284,360 B1
(45) Date of Patent: Mar. 22, 2022

(54) AUTOMATIC GAIN CONTROL SCHEMES FOR LOW-POWER PERSONAL AREA NETWORK ENHANCED DATA RATE (EDR) TRANSCEIVERS

(71) Applicant: Amazon Technologies, Inc., Seattle, WA (US)

(72) Inventors: Songping Wu, Palo Alto, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 16/745,001

(22) Filed: Jan. 16, 2020

Related U.S. Application Data

(60) Provisional application No. 62/896,976, filed on Sep. 6, 2019.

(51) Int. Cl.
*H04W 52/52* (2009.01)
*H04W 88/06* (2009.01)
*H04L 27/20* (2006.01)
*H04W 52/02* (2009.01)
*H04B 1/40* (2015.01)

(52) U.S. Cl.
CPC .............. *H04W 52/52* (2013.01); *H04B 1/40* (2013.01); *H04L 27/2017* (2013.01); *H04W 52/0245* (2013.01); *H04W 88/06* (2013.01)

(58) Field of Classification Search
CPC ....................................................... H04L 12/28
USPC ............................................................ 370/400
See application file for complete search history.

(56) References Cited

U.S. PATENT DOCUMENTS

| 7,061,997 | B1 | 6/2006 | Eberlein et al. | |
|---|---|---|---|---|
| 2008/0056305 | A1 | 3/2008 | Medvedev et al. | |
| 2008/0181155 | A1 | 7/2008 | Sherman et al. | |
| 2013/0201316 | A1* | 8/2013 | Binder | H04L 67/12 348/77 |
| 2018/0212629 | A1* | 7/2018 | Tsuboi | H03M 13/29 |

* cited by examiner

*Primary Examiner* — Dang T Ton
(74) *Attorney, Agent, or Firm* — Lowenstein Sandler LLP

(57) ABSTRACT

Technologies directed to improving power for wireless transceivers are described. One method processes, in a first power mode, a first portion of a data packet, the first portion being modulated with a FSK modulation. The method determines a first gain value for an amplifier and determines that the first data packet has a second portion that is modulated with a PSK modulation. The method determines a receive signal strength indicator (RSSI) value associated with the first portion and determines that the RSSI does not exceed a threshold value corresponding to a throughput requirement. The method switches to a second power mode, the second power mode being higher in power than the first power mode. The method determines, in the second power mode, a second gain value for the amplifier and process the second portion of the first data packet. The second gain value is determined before the processing the second portion.

20 Claims, 9 Drawing Sheets

AUTOMATIC GAIN CONTROL SCHEMES FOR LOW-POWER PERSONAL AREA NETWORK ENHANCED DATA RATE (EDR) TRANSCEIVERS

RELATED APPLICATIONS

This application claims the benefit of Provisional Application No. 62/896,976, filed Sep. 6, 2019, the entire content is hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
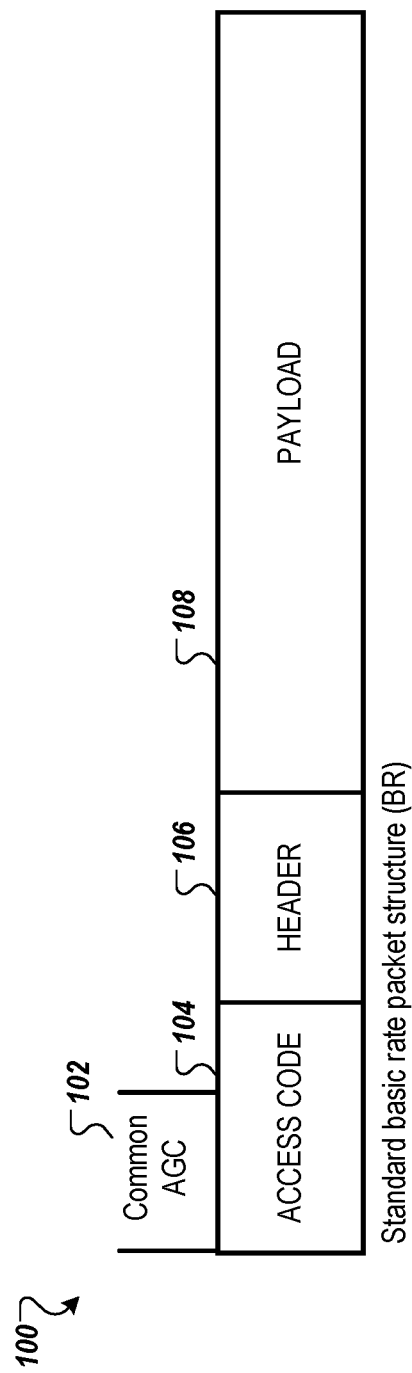
FIG. 1A illustrates a common automatic gain control (AGC) performed on a basic rate (BR) according to one embodiment.

Technologies directed to improving power for wireless transceivers are described. The Bluetooth® wireless technology has been widely adopted across the consumer industry in many consumer products, including smart phones, smart wearable, wireless speakers, etc. One of the problems with all mobile consumer electronics is that they rely on the battery to operate. Therefore, the battery life has been a consistent topic in terms of customer experience. Wireless connectivity, including the Bluetooth® transceiver, contributes to a significant part of power consumption to these mobile devices. Therefore, the optimization of their power consumption is an important part of the formula that aims to optimize the battery life.

The Bluetooth® technology operates in both ways, with the power consumption from both transmitter (TX) and receiver (RX). A significant part (typically around 50%) of TX power consumption comes from its RF power amplifier (PA) due to its low efficiency. RX power consumption comes from RF and baseband signal processing, central processing unit (CPU) protocol processing, and peripherals. Conventionally, Bluetooth® technology can save power by dividing its operations into a few modes, including active mode, sniff mode, hold and park mode, where the sniff, hold and park modes indicates lower levels of activities by setting the nodes into standby (sniff), sleep (hold) or deep sleep (park) modes with extended duty cycle and reduced packet lengths. With each power mode, the TX or RX keeps a constant power consumption when dealing with the whole packet. While this helps power management, the power management is not optimized.

Frequency Shift Key (FSK) or Phase Shift Keying (PSK) is the modulation techniques that are commonly used in contemporary wired/wireless communications. The Bluetooth® classic technology contains two modes, basic rate (BR) or enhanced data rate (EDR). The physical packet structure looks similar for both modes, with the same access code and packet header, modulated with the same Gaussian Frequency Shift key (GFSK) modulation for both packet types. That is, the access code and the packet header for an EDR packet is modulated with GFSK, just like the access code and the packet header for a BR packet is modulated with GFSK. The content of packet header will indicate what mode is contained in a subsequent payload of a packet. For BR packets, the packet header will indicate the BR mode and will have a data payload modulated with GFSK. The data payload of the BR packet contains GFSK modulated BR data. For EDR packets, the packet header will indicate the EDR mode and will have a data payload modulated with a differential phase shift key (DPSK) modulation. The data payload of the EDR packet contains DPSK modulated EDR data. The DPSK can be differential quadrature phase shift key ($\pi/4$-DQPSK) modulation or eight phase shift key (8DPSK) modulation. Also, a guard interval will proceed the data payload of the EDR packet. While the BR mode has a physical data rate of 1 Mbps, the EDR mode increases the physical data rate to 2 Mbps or 3 Mbps to address throughput requirements for some applications, such as music downstream or hands-free voice calls.

The access codes in the Bluetooth® technology include a 4-bit preamble for direct current (DC) compensation and AGC, 64-bit synchronization word (sync word) for packet validation and symbol boundary determination, and a 4-bit trailer to conclude the ending of the access codes. AGC can be used to determine a gain value (or other gain settings) for an amplifier in a receiver. The gain value can represent a level of gain used by the gain amplifier or set of amplifiers as described herein. For the EDR mode, however, conventional receivers use the same gain setting, from the AGC running on the GFSK portion with the access codes and packet header, for the DPSK portion with the data payload because the Bluetooth® technology requires that the same average power should be used in DPSK and GFSK portions of an EDR packet.

Aspects of the present disclosure Aspects of the present disclosure overcome the deficiencies of conventional receivers by providing two AGC schemes for receivers to operate with lower power while processing the GFSK portion of the packet and to operate with higher power while processing the DPSK portion of the packet. Aspects of the present disclosure allow a better AGC scheme (two AGC processes) that can help with low power receiver design for personal area network (PAN) radios, wireless local area network (WLAN) radios, or the like, while still performing the same quality gain adjustments as before. Aspects of the present disclosure provide a lower power Bluetooth® receiver than conventional Bluetooth® receivers, while allowing EDR mode. In some cases, aspects of the present disclosure can be used in connection with an in-packet dynamic power adaptation with the analysis of current received signal characteristics shown in a preamble and data payload and perform a corresponding adjustment of power consumption for subsequent packets.

Aspects of the present disclosure provide the capability of performing a first AGC process on a preamble and performing a second AGC process on a guard interval of an EDR packet, the guard interval being between a first portion of the EDR packet and a second portion of the EDR packet, and the second portion containing the data payload of EDR packet. The first AGC process is also referred to as "common AGC" since the first AGC process is performed on both BR packets and EDR packets, whereas the second AGC process is referred to as "EDR AGC" since the second AGC process is performed only on EDR packets. The two AGC processes can facilitate low-power design for EDR packets, which are commonly used for music streaming and audio phone calls. As described herein, in the proposed two-AGC scheme, the receiver is always set into a lower-power mode, the lower-power mode being associated with a subset of gain amplifier settings. The common AGC can be used to adapt the gain level(s) to a dynamic range within this subset of gain amplifier settings. The EDR AGC should be turned on in certain conditions. For example, if a low-signal quality is identified during sync word detection for a valid EDR packet, then the guard interval, specified as a value in the packet header, can be leveraged to turn on a full set of gain amplifier settings and adjust gain amplifier settings to the optimal setting.

Aspects of the present disclosure can further optimize the power consumption as it improves the precision of power adaptation by zooming into the fine details of each physical packet. The rationale behind this optimization is that of a dynamic environment, multiple access, and interference. For the dynamic environment, the over-the-air (OTA) communication channel is changing all the time due to device mobility. While the power scheme is simple to have a constant power scheme for TX and RX processing over a long period, it is suboptimal. For example, when communication distance is short between two Bluetooth® compatible devices, the signals seen at both sides are strong with high quality, aspects of the present disclosure can switch to a lower power processing mode where some advanced processing circuit can be turned off with worse sensitivity but still provide a good margin to achieve sufficient communications quality. For multiple access, there can be a lot of traffic over the air. A Bluetooth® receiver can accidently pick up traffic belonging to another Bluetooth® link and find out later after full-power processing it for a while. The aspects of the present disclosure can avoid this situation by checking the packet signature through its preamble (e.g., access code section) and developing an early intervention when the packet signature does not match. For interference, the wireless frequency bands at 2.4 GHz can be very crowded with many WiFi®/Bluetooth®/ZigBee® devices. When there is a strong interference nearby that corrupts the Bluetooth® transmission, the Bluetooth® transceiver does not need to waste power to decode the OTA packet if it knows it's fully corrupted and cannot be recovered.

One method processes, in a first power mode, a first portion of a data packet received over a wireless link between the wireless device and a second wireless device, the first portion being modulated with a FSK modulation. The method determines a first gain value for an amplifier of the wireless device during the processing the first portion and determines, from information in the first portion, that the first data packet has a second portion that is modulated with a PSK modulation. The method determines a receive signal strength indicator (RSSI) value associated with the first portion after the determining the first gain value and determines that the RSSI does not exceed a threshold value corresponding to a throughput requirement. The method switches to a second power mode responsive to the RSSI value not exceeding the threshold value and the first data packet having the second portion that is modulated with the PSK modulation. The second power mode is higher in power than the first power mode. The method determines, in the second power mode, a second gain value for the amplifier and process the second portion of the first data packet. The second gain value is determined before the processing the second portion.

FIG. 1A illustrates a common AGC 102 performed on a BR packet 100 according to one embodiment. The BR packet 100 includes an access code section 104, a packet header section 106, and a payload section 108. The sections can also be referred to as fields and contain data for the respective fields or sections. In some cases, the access code section 104 includes a preamble that includes a multi-bit number that precedes the access code section 104. In other cases, the preamble can referred to a portion of a data packet that precedes the data payload, such as in the payload section 108. In these cases, the preamble includes an access code in the access code section 104 and a packet header in the packet header section 106, both of which are transmitted before the data payload in the payload section 108. In some cases, the access code section 104 can include a preamble, a sync word, and an optional trailer. The access code section 104 can be used for timing synchronization, offset compensation, paging, and inquiry. In Bluetooth® technology, there can be three access code, including a Channel Access Code (CAC) that is used for identifying a master device, a Device Access Code (DAC) that is used identifying a paged device in paging or response to paging, and Inquiry Access Code (IAC) that is used for inquiry purposes. The access code section can include information about the physical channel access code, whereas the packet header section 106 can contain information about a logical link layer, such as a logical transport identifier, a logical link identifier, and a link control protocol. The packet header section 106 can also include information that indicates a packet type of a data packet. In this case, the packet header section 106 identifies the data packet as a BR packet type. The payload section 108 includes the data being transmitted.

In this embodiment, the common AGC 102 is performed during the access code section 104. In one embodiment, the common AGC 102 is performed on the preamble that precedes the access code within the access code section 104. In general, AGC is a feedback system, such as an AGC circuit, that regulates an amplifier or a chain of amplifiers in a receiver. The AGC functions to maintain a suitable signal amplitude at its output, despite variations. An average or peak in the output signal can be used to dynamically adjust a gain of the amplifiers, allowing the receiver to operate with a greater range of input signal levels. As described herein, the common AGC 102 is an AGC process that determines a gain value for an amplifier of a receiver that receives incoming data packets. The amplifier can include a dynamic range that can be adjusted by different gain levels. The common AGC 102 can determine an appropriate gain value for the amplifier to process the subsequent sections of the data packet, such as the header section 106 and the payload section 108. In some cases, the common AGC 102 determines a gain value (also referred to as a gain amplifier setting or a range of gain levels used by the receiver to validate a data packet) and configures the amplifier to operate with the gain value. The common AGC 102 can determine gain value before a RSSI value is determined for the data packet. The amplifier can include a set of gain settings when operating at a normal power level. When in a lower power level, the amplifier can operate with a subset of the gain settings. The common AGC 102 can determine an appropriate gain value (i.e., appropriate range) within the subset of gain settings.

As described herein, FSK and PSK bring a low-power design to both transmitter and receiver due to its constant envelopes. It also simplifies and therefore brings a low-cost design with its simple implementation at both ends. Typical examples includes GSM standard with Gaussian FSK (GFSK), Bluetooth standard which adopts GFSK and differential QPSK (DQPSK) and differential 8PSK (8DPSK) for its transmission, and ZigBee with minimum shift keying (MSK, also called OQPSK), which is a variant of FSK modulation. The BR packet 100 can be modulated using a first shift key modulation, such as a frequency shift key modulation. In the Bluetooth® technology, such as illustrated in FIG. 1A, the BR packet 100 is modulated using GFSK.

Figure 1B:
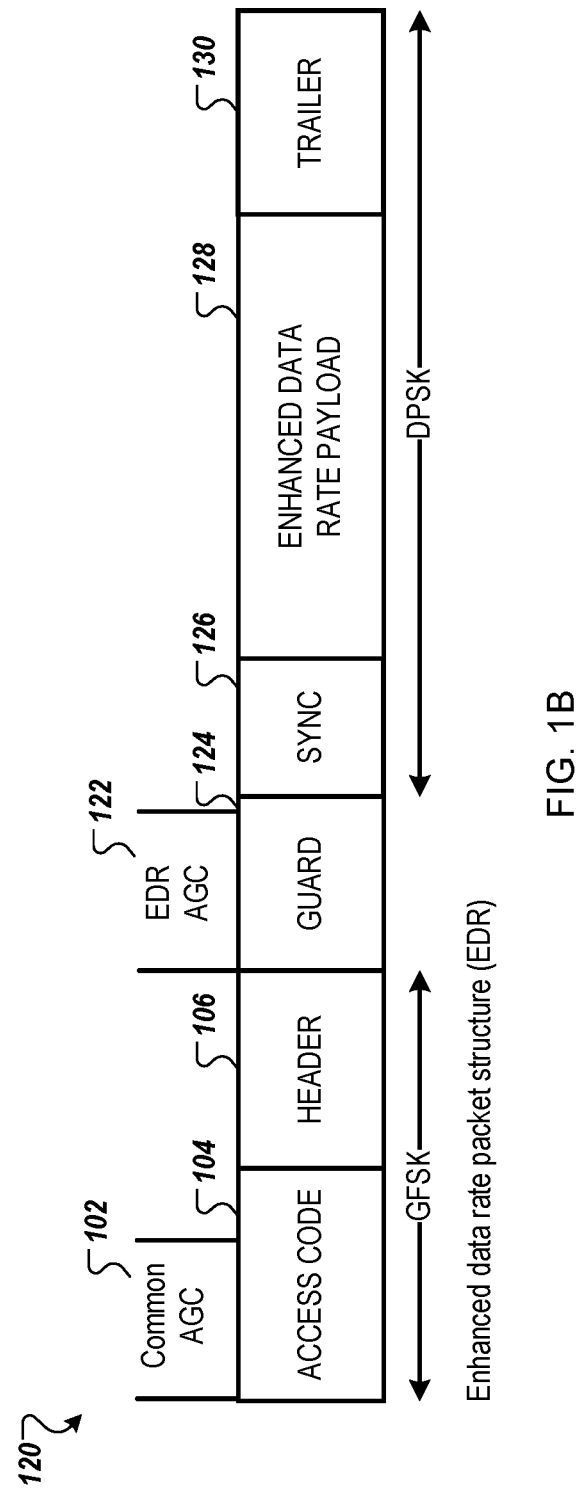
FIG. 1B illustrate a common AGC and an enhanced data rate (EDR) AGC performed on an EDR packet according to one embodiment.

FIG. 1B illustrate a common AGC and an EDR AGC performed on an EDR packet 120 according to one embodiment. The EDR packet 120 includes the access code section 104, the packet header section 106, the payload section 108, a guard interval 124, a synchronization section 126, an enhanced data rate payload section 128, and an optional trailer 130. The access code section 104 and the packet header section 106 of the EDR packet 120 are the same as described for the BR packet 100. The packet header section 106 of the EDR packet 120 can include information that indicates a packet type of a data packet. In this case, the packet header section 106 identifies the data packet as an EDR packet type.

The EDR packet 120, unlike the BR packet 100, includes a value indicative of the guard interval 124 and the synchronization section 126 before the data payload, referred to as the enhanced data rate payload section 128. The enhanced data rate payload section 128 includes the data being transmitted. The EDR packet 120 can include the optional trailer 130 to indicate an end of the EDR packet 120.

In this embodiment, the common AGC 102 is performed during the access code section 104. In one embodiment, the common AGC 102 is performed on the preamble that precedes the access code within the access code section 104. The common AGC 102 determines a gain value for the amplifier for processing a first portion of the EDR packet 120, the first portion including the packet header section 106, and any remaining portion of the access code section 104. While processing the packet header section 106, a packet type of the EDR packet 120 is determined to be the EDR type. As such, the guard interval 124 and the synchronization section 126 are before the enhanced data rate payload section 128. The common AGC 102 can determine a gain value before a RSSI value is determined for the data packet. The amplifier can include a set of gain settings when operating at a normal power level. When in a lower power level, the amplifier can operate with a subset of the gain settings. The common AGC 102 can determine an appropriate gain level (i.e., appropriate range) within the subset of gain settings.

The common AGC 102 can be performed in a first power mode. Once the EDR packet 120 is determined to be an EDR type from processing the header section 106, the receiver can be switched from the first power mode to a second power mode and an EDR AGC 122 is performed to determine a second gain value for the amplifier for processing the second portion of the EDR packet 120. The EDR AGC 122 can be performed during the guard interval 124. The guard interval 124 is between the first portion, including the access code section 104 and the packet header section 106, and the second portion, including the synchronization section 126, the enhanced data rate payload section 128, and the optional trailer 130.

Figure 2:
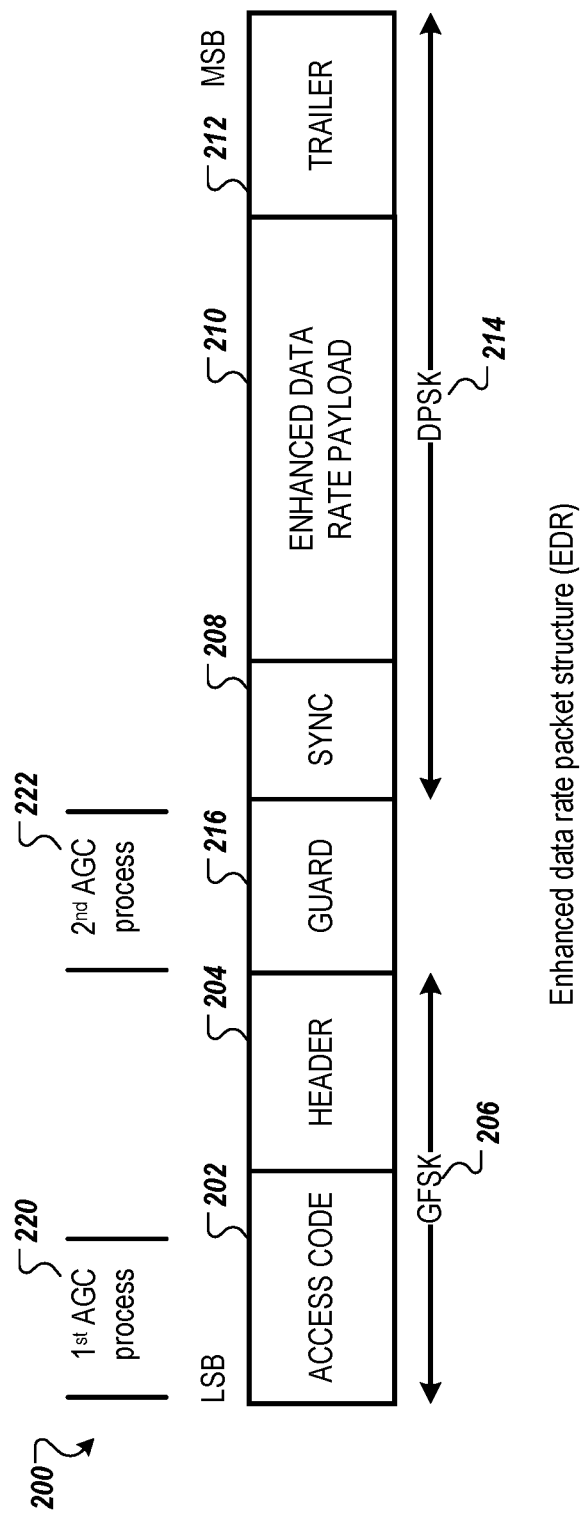
FIG. 2 illustrates a first AGC process and second AGC process performed on an EDR packet according to one embodiment.

One key feature of the EDR packet 120 is that the modulation scheme is changed within the EDR packet 120. The first two section of the data packet, including the access code and the packet header sections, are transmitted using Gaussian Frequency shift keying (GFSK) modulation and the remaining sections of the data packet after the guard interval are transmitted using Differential Phase Shift Keying (DPSK), such as π/4-DQPSK or 8-DPSK depending on the data rate of the wireless link. The first portion of the EDR packet 120 can be modulated using a first shift key modulation, such as a frequency shift key modulation, and the second portion of the EDR packet 120 can be modulated using a second shift key modulation, such as a phase shift key modulation. In the Bluetooth® technology, such as illustrated in FIG. 1B, the first portion of the EDR packet 120 is modulated using GFSK and the second portion of the EDR packet 120 is modulated using DPSK, such as illustrated in FIG. 2.

The description below provides a methodology to calibrate and correct the gain of an amplifier of a receiver. The amplifier can be an internal low noise amplifier (LNA), an external low noise amplifier (eLNA), or any combination. For example, the receiver can include an internal LNA for a low power mode and an external LNA is turned on for a higher power mode. The amplifier can be part of a Bluetooth® receiver, as described herein. In other embodiments, the amplifier can be part of other types of receives, such as other PAN radios, WLAN radios, or the like where different modulations are used for enhanced data rates, for example.

In one implementation in Bluetooth® Classic, there are two typical applications—one application for music streaming, which uses Advanced Audio Distribution profile (A2DP), and another application for phone calls, which uses hand-free profile (HFP). The A2DP profile is the Bluetooth® Stereo profile which defines how high quality stereo audio can be streamed from one device to another over a wireless connection, such as music streamed from a mobile phone to wireless headphones. The HFP profile provides an extended functionality to a handset profile (HSP), which only provides basic functionalities needed for communication between a handset (cell phone) and a headset. Although many products may have Bluetooth® enabled for voice calls, in order for music to be streamed from one Bluetooth device to another, both devices will need to have this A2DP profile. If both devices to do not contain this A2DP profile, the standard HSP or the HFP can still be used but do not support stereo music.

Both of these profiles depend on enhanced data rates which 2 Mbps and 3 Mbps data rates that use π/4-DQPSK and 8DPSK modulations. The construction of 2 Mbps packet and 3 Mbps packet are illustrated and described with respect to FIG. 1B and FIG. 2 below.

FIG. 2 illustrates a first AGC process and second AGC process performed on an EDR packet 200 according to one embodiment. The EDR packet 200 includes an access code 202 (labeled as ACCESS CODE) and a packet header 204 (labeled as HEADER), which are GFSK modulated 206 at 1 Mbps data rate. The EDR packet 200 also includes a synchronization sequence 208 (labeled as SYNC), a data payload 210 (labeled as ENHANCED DATA RATE PAYLOAD), and a trailer 212 (labeled as TRAILER), which are DPSK modulated 214 at 2 Mbps (π/4-DQPSK) or at 3 Mbps (8DPSK). The DPSK modulation used depends on whether the EDR packet 200 is 2 Mbps packet or 3 Mbps packet. A guard interval 216 (labeled as GUARD) is an interval of time for the radios to switch between the two types of modulations. The length of the guard interval 216 can be specified as a value between 4.75 s and 5.25 s. In some cases, the value of the guard interval 216 is 5 s.

A first AGC process 220 can be performed in a first power mode. The first AGC process 220 can be performed while processing the first portion of the EDR packet 200 (e.g., 202, 204). Once the EDR packet 120 is determined to be an EDR type from processing the packet header 204, the receiver can be switched from the first power mode to a second power mode and a second AGC process 222 is performed to determine a second gain value for the amplifier for processing the second portion of the EDR packet 120. As part of switching from the first power mode to the second power mode, an additional amplifier can be powered on and the second AGC process 222 can be performed to determine a gain value for the two amplifiers. One amplifier can be an internal LNA and the additional amplifier can be an external LNA or a cascaded LNA. The second AGC process 222 can be performed during the guard interval 216. The guard interval 216 is between the first portion, including the access code 202 and the packet header 204, and the second portion, including the synchronization sequence 208, the data payload 210, and the trailer 212.

The SNR requirements for GFSK modulation is lower than π/4-DQPSK modulation and followed by 8DPSK modulation. Hence, the receive sensitivity of 1 Mbps GFSK modulation is higher than π/4-DQPSK and 8DPSK. This also means when a packet is received by the Bluetooth® receiver the GFSK portion of the data packet at the BR gets received correctly and the EDR portion of the data packet at the EDR (π/4-DQPSK and 8DPSK packets) can be corrupted without adjusting the receive sensitivity. Also, a link budget of the Bluetooth® device for the transmission power of the GFSK is higher than (3 dB) than DQPSK and 8DPSK modulations. This also helps in correctly receiving the GFSK portion of the packet. To help receive the EDR packets, an external LNA or a cascaded LNA (internal to the chip) can be used to boost a signal and improve the noise figure. However, the use of an external LNA or cascaded to boost the signal increase power consumption of the chip. This can impact up to two times the current consumption for the external LNA or cascaded LNA to provide approximately 6 dB of improvement. Additional details regarding an algorithm to save power consumption is described in more detail below with respect to FIGS. 5-6.

Figure 3:
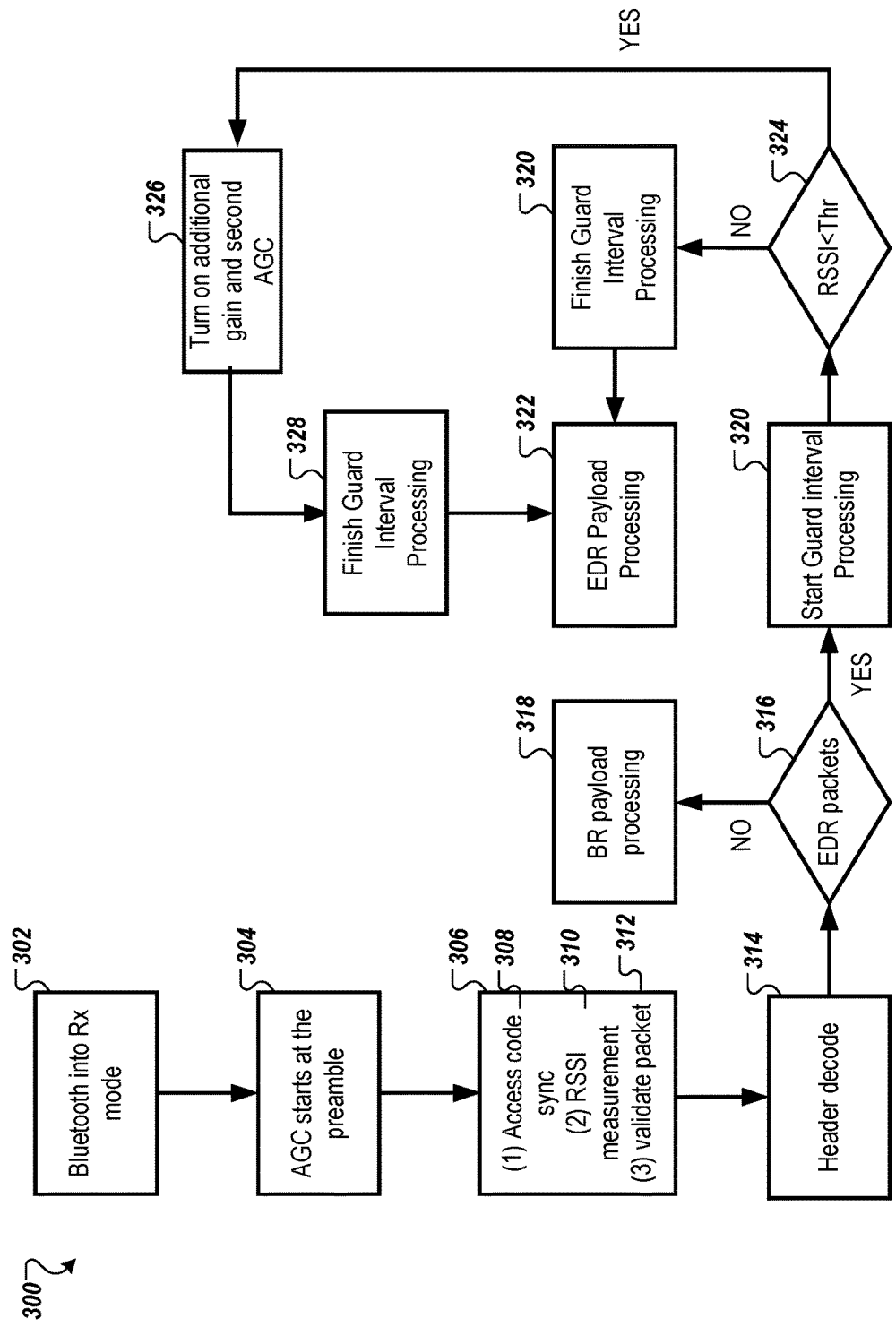
FIG. 3 is a flow diagram of a method for processing BR and EDR packets with one or more two AGC processes according to one embodiment.

FIG. 3 is a flow diagram of a method 300 for processing BR and EDR packets with one or more two AGC processes according to one embodiment. The method 300 may be performed by processing logic that comprises hardware (e.g., circuitry, dedicated logic, programmable logic, microcode, etc.), software, firmware, or a combination thereof. In one embodiment, the method 300 may be performed by any of the processing devices described herein and illustrated with respect to FIGS. 3 and 7.

Referring back to FIG. 3, the method 300 begins by the processing logic determining that a personal area network (PAN) radio of a wireless device is put into receive (RX) mode (block 302). The PAN radio can include a receiver with one or more gain amplifiers and a central processing unit (CPU) coupled to the receiver. Once the wireless device is in RX mode, the processing logic starts a first AGC process at a preamble of a data packet (block 304). In order to be in the RX mode, the processing logic previously establishes a wireless link between the PAN radio and another radio of a second wireless device. In some cases, the wireless device can start in a first power mode for the RX mode.

The processing logic at block 304 can start to receive a first portion of a first data packet over the wireless link via the PAN receiver. The first portion includes a packet header that identifies a packet type of the first data packet. The first portion can be modulated using GFSK modulation. At block 304, the processing logic can determine a first gain value for the gain amplifier. The first AGC process at block 304 can be performed while processing the first portion. The processing logic configures the gain amplifier to operate with the first gain value for subsequent processing of the first portion.

At block 306, the processing logic can perform, in a first power mode, various operations, as follows: (a) the processing logic performs an access code synchronization (operation 308); (b) the processing logic measures a RSSI value (operation 310); and the processing logic validates the data packet (operation 312).

For operation 308, the processing logic can perform an access code correlation operation to determine whether the data packet is random noise, directed to another wireless device, or directed to this wireless device. For example, the processing logic can decode the access code in the preamble of the data packet (operation 112). During operation 308, the access code can be used for synchronization.

For operation 310, the RSSI is a general term defined in the standard which indicates a signal strength of a wireless link. The RSSI value, for example, can be in a range of [−100, 0] dBm. Alternatively, other ranges can be used. The RX signal processing block can measure the RSSI value after or at the end of the first AGC process at block 304. The RSSI value measured at block 306 is associated with the first portion of the data packet. The RSSI value can be measured after the gain amplifier is configured to operate with the first gain value as a result of the first AGC process started at block 304.

At block 306, the processing logic determines whether the data packet is a valid packet (operation 312). If the data packet is not valid, the wireless device can remain in the first power mode, returning to block 302. When the data packet is a valid packet at block 306, the processing logic decodes the packet header (block 314). At block 316, the processing logic determines the packet type from the packet header. The packet type can be a BR packet or an EDR packet, as described herein. When the packet type is BR at block 316, the processing logic starts BR payload processing (block 318). At block 318, the processing logic processes the data payload of the BR packet, such as by demodulating the second portion using GFSK. However, when the packet type is EDR at block 316, the processing logic starts guard interval processing (block 320) before starting EDR payload processing (block 322). In connection with the guard interval processing at block 320, the processing logic determines whether the RSSI value exceeds a threshold value (block 324). The threshold value at block 324 corresponds to a defined throughput requirement for the EDR packet. For example, when using the Bluetooth® technology, the threshold value can be defined to indicate where a strong signal is detected when the RSSI value is greater than the threshold value (e.g., RSSI>=Thr). For example, the threshold value can be defined as −60 dBm (e.g., A=−60 dBm). Alternatively, the threshold value can be set at other values.

When the RSSI value exceeds the threshold value at block 324, the processing logic finishes the guard interval processing (block 320) and starts the EDR payload processing (block 322). At block 322, the processing logic processes the data payload of the EDR packet, such as by demodulating the second portion using DPSK.

When the RSSI value does not exceed the threshold value at block 324, the processing logic can start a second AGC process to determine a second gain value for the amplifier (block 326). In some cases, the processing logic can turn on additional resources, such as an external LNA or cascaded LNA, to provide additional gain for receive sensitivity.

At block 328, the processing logic finishes the guard interval processing. After the guard interval processing is finished, the processing logic starts the EDR payload processing (block 322). At block 322, the processing logic processes the data payload of the EDR packet, such as by demodulating the second portion using DPSK.

At block 326, the processing logic can determine a second gain value for the gain amplifier or a set of gain amplifiers. The second AGC process at block 326 can be performed during the guard interval process before processing the second portion. Alternatively, the second AGC process at block 326 can be performed during the synchronization sequence of the second portion before processing the data payload. The processing logic configures the gain amplifier to operate with the second gain value for subsequent processing of the second portion.

In one embodiment, in response to determine that the packet type is EDR at block 316 and that the RSSI value does not exceeding the threshold value at block 324, the processing logic switches to a second power mode of the wireless device responsive. The second power mode is higher in power than the first power mode.

In one embodiment, the processing logic, in the second power mode, determines a second gain value for the gain amplifier by performing the second AGC process during a guard interval between the packet header and a second portion of the first data packet. The second portion includes an EDR payload and the second portion is modulated using DPSK modulation. The processing logic configures the gain amplifier to operate with the second gain value and receives the second portion after the guard interval. The processing logic receives the second portion over the wireless link via the PAN receiver while the gain amplifier is configured to operate with the second gain value. The processing logic processes the EDR payload. The processing logic can process the EDR payload by demodulating the EDR payload using DPSK modulation. The first gain value determined from the first AGC process can correspond with the first power mode and the second gain value determined from the second AGC process can correspond to the second power mode.

In one embodiment, the wireless device includes a first modem and a second modem. The first modem demodulates the first portion using GFSK modulation. The second modem demodulates the second portion using DPSK, such as π/4-DQPSK modulation or 8-DPSK modulation.

After the processing logic performs the EDR payload processing at block 322, the method 300 can return to receive a second data packet. In this embodiment, the processing logic receives a first portion of a second data packet over the wireless link via the PAN receiver. The first portion of the second data packet includes a packet header that identifies a packet type of the second data packet, and the first portion of the second data packet being modulated using GFSK modulation. The processing logic determines a third gain value for the gain amplifier by performing the first AGC process while processing the first portion of the second data packet. The processing logic configures the gain amplifier to operate with the third gain value. The processing logic determines a second RSSI value associated with the first portion of the second data packet after the gain amplifier is configured to operate with the third gain value. The processing logic determines from the packet type that the second data packet is a basic rate (BR) packet, the BR packet having a lower data rate than the EDR packet. The processing logic determines that the RSSI value does not exceed the threshold value. The processing logic configures the gain amplifier to continue to operate with the third gain value responsive to a determination that the second data packet is the BR packet. The processing logic receives a second portion of the second data packet over the wireless link via the PAN receiver while the gain amplifier is configured to operate with the third gain value, the second portion of the second data packet comprising a BR payload and the second portion of the second data packet being modulated using GFSK. The processing logic processes the BR payload.

Figure 4:
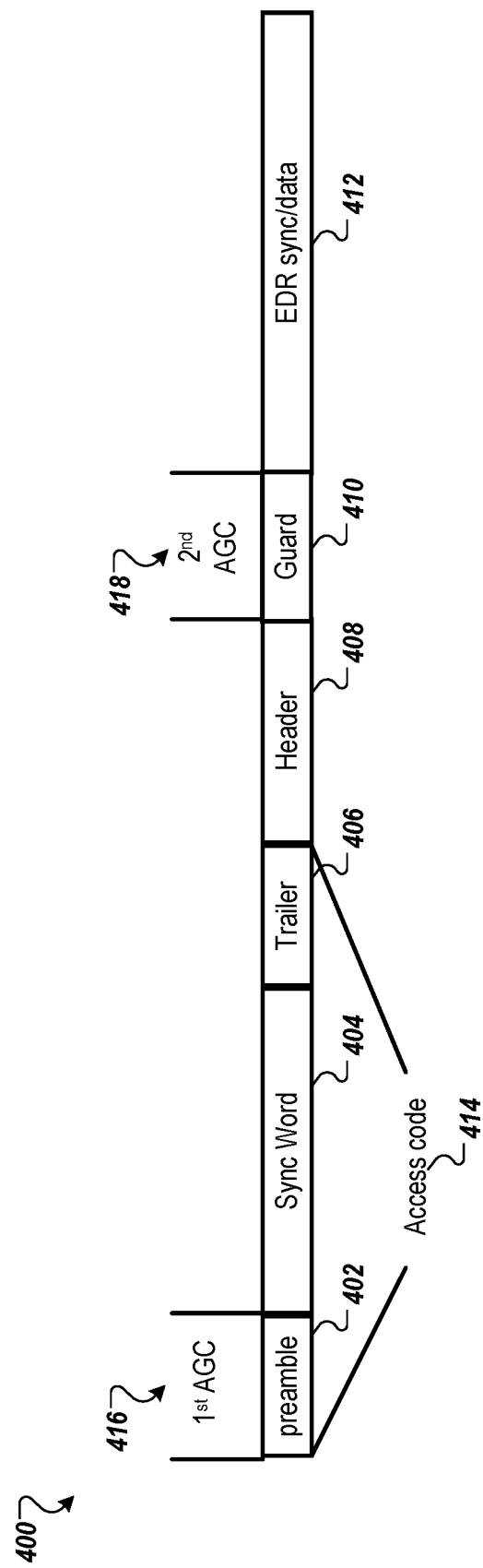
FIG. 4 illustrates a data packet for which two AGC processes are performed according to another embodiment.

FIG. 4 illustrates a data packet 400 for which two AGC processes are performed according to another embodiment. The data packet 400 includes a preamble 402, a sync word 404, a trailer 406, a packet header 408, a guard interval 410, and EDR sync/data 412. The preamble 402, the sync word 404, and the trailer 406 can be considered an access code section of the data packet 400. A first AGC 416 can be performed during a portion of the access code section 414, such as during the preamble 402. A second AGC 418 can be performed during a time period specified as a value in the guard interval 410 before the EDR sync/data 412 is received and processed. As described herein, in the proposed two-AGC scheme, the receiver is always set into a lower-power mode, the lower-power mode being associated with a subset of gain amplifier settings. The first AGC 416 can be used to adapt the gain level(s) to a dynamic range within this subset of gain amplifier settings. The second AGC 418 should be turned on in certain conditions. For example, if a low-signal quality is identified during sync word 404 detection for a valid EDR packet, then the value of the guard interval 410, specified in the packet header 408, can be leveraged to turn on a full set of gain amplifier settings and adjust gain amplifier settings to the optimal setting for processing the EDR sync/data 412.

Figure 5:
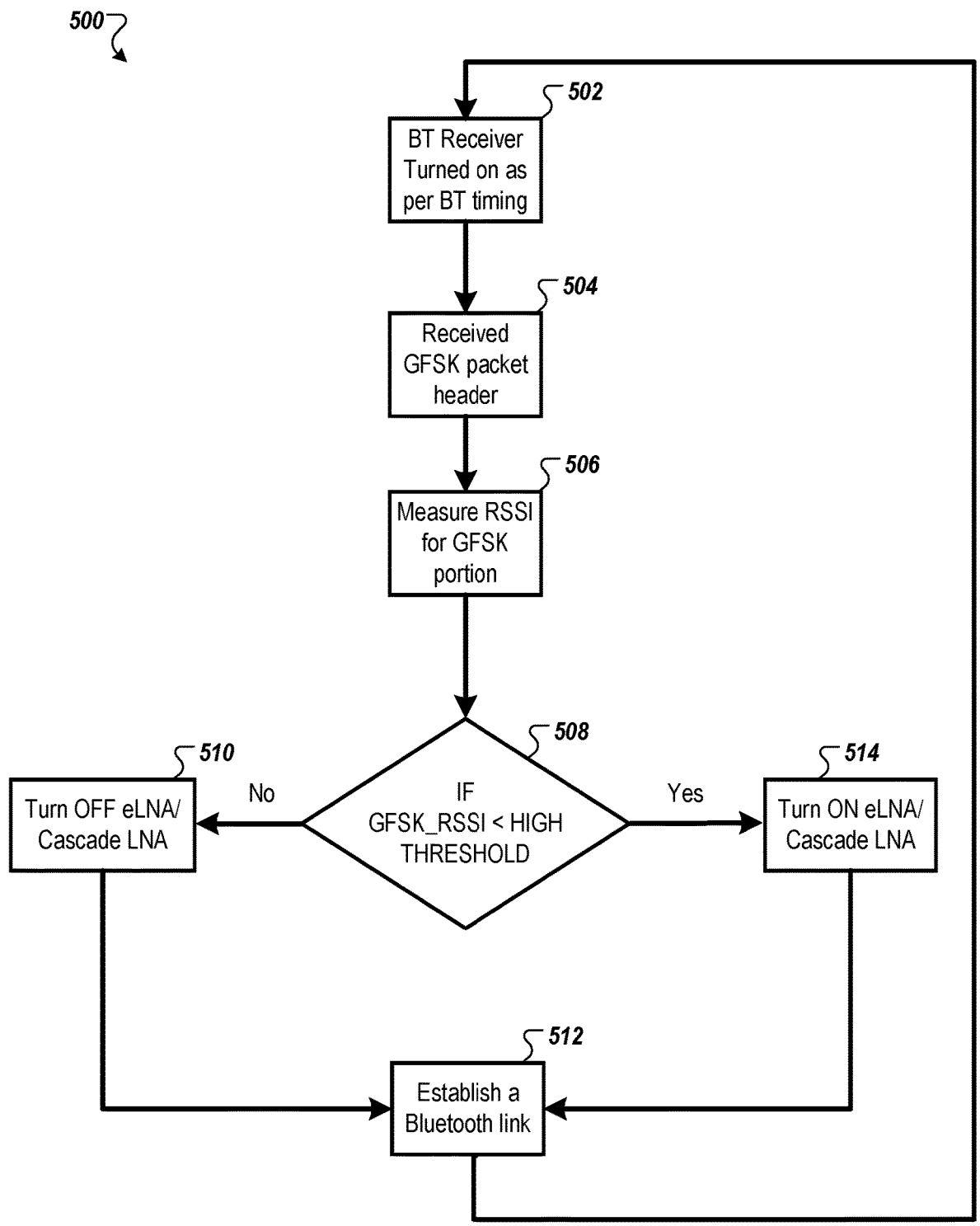
FIG. 5 is a flow diagram of an algorithm to reduce power consumption by a Bluetooth® receiver in connection with the two-AGC scheme according to one embodiment.

FIG. 5 is a flow diagram of an algorithm 500 to reduce power consumption by a Bluetooth® (BT) receiver in connection with the two-AGC scheme according to one embodiment. The algorithm 500 may be performed by processing logic that comprises hardware (e.g., circuitry, dedicated logic, programmable logic, microcode, etc.), software, firmware, or a combination thereof. In one embodiment, the algorithm 500 may be performed by any of the processing devices described herein and illustrated with respect to FIGS. 3 and 7.

Referring back to FIG. 5, the algorithm 500 begins by turning on the BT receiver as per the BT timing (block 502). The BT receiver waits until a GFSK portion of the data packet is received (block 504) and measure the RSSI of the first portion of the data packet (block 506). This RSSI value is measured by the preamble and packet header of the EDR packet that has 1 Mbps GFSK modulation. This GFSK portion has a higher receiver sensitivity of the BT receiver because of a low signal-to-noise ratio (SNR). The BT receiver validates whether the RSSI value exceeds a threshold value (GFSK_RSSI>HIGH THRESHOLD) (block 508). The threshold value needs to be programmed based on the chipset. The BT receiver validates the receiver sensitivity difference between 1 Mbps GFSK and ⅔ Mbps DPSK modes. For example, the receiver sensitivity (RXS_GFSK) for the 1 Mbps mode could be −94 dBm, whereas the receiver sensitivity (RXS_DPSK) for the 8DPSK mode could be −87 dBm. So, using a 3 dBm guard rail, the threshold value could be programmed to −84 dBm. The threshold value can be expressed in the following equation (1):

$$\text{THRESHOLD} = \text{RXS\_GFSK} - \text{RXS\_DPSK} - \text{GUARD RAIL} \quad (1)$$

If RSSI value (GFSK_RSSI) at block 508 is greater than the threshold value at block 508, the BT receiver can turn on one or more additional amplifiers (block 514). For example, an external LNA or a cascaded LNA can be turned on. The second AGC of the BT receiver has more than enough time (e.g., 5 μs) to settle on a new gain level. The new gain level is considered a second gain level because the first AGC performed during the first portion of the data packet settled on a first gain level for a reduced set of amplifiers in the lower power mode. This second gain level is relatively low compared to the AGC threshold values of the BT receiver, which could be around 20 to 40 dB. Also, the BT receiver can be at a maximum gain stage at this point when it is receiving a weak packet. The additional amplifier can add 6 dB of gain that can help boost the signal for the EDR portion of the data packet, reducing the impact of noise. As a result, the signal can be decoded correctly and thereby improving the receiver sensitivity of the EDR signal.

If RSSI value (GFSK_RSSI) at block 508 is less than the threshold value at block 508, which indicates that the data packet is a good packet and does not need additional amplification, the BT receiver can turn off (or keep off) the one or more additional amplifiers. By not turning on or turning off the one or more additional amplifiers, the BT receiver can save power. In some cases, the algorithm 500 can save at least 15% of the battery life while playing music or making a phone call. The battery savings is beneficial for some devices, especially for the hearable and wearable category of devices, where the product size and battery size are very crucial for customer experience requirements.

Figure 6:
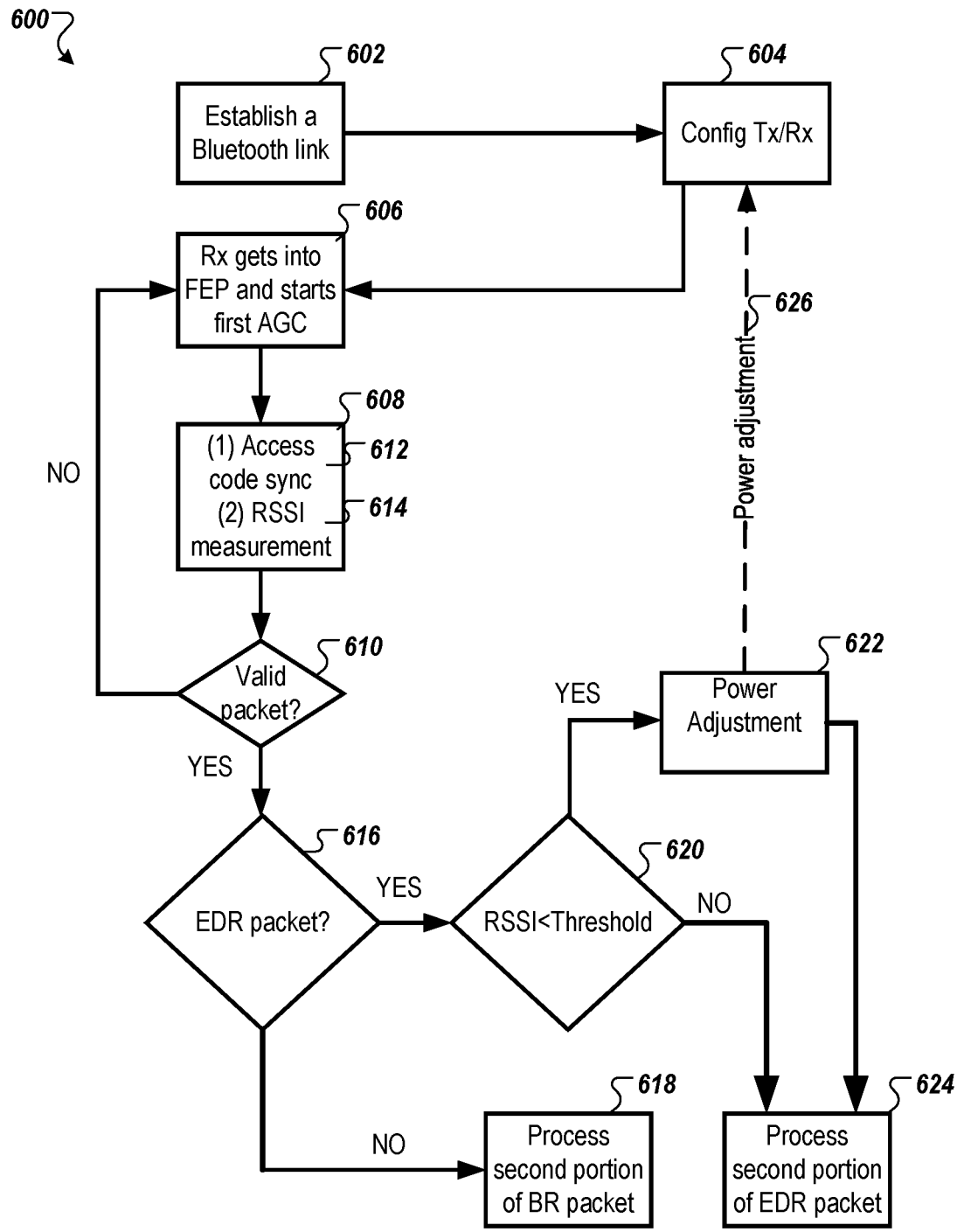
FIG. 6 is a functional diagram of a wireless device with a power adjustment logic for processing EDR packets according to one embodiment.

FIG. 6 is a functional diagram of a wireless device 600 with a power adjustment logic for processing EDR packets according to one embodiment. The wireless device 600 includes a receiver with a gain amplifier. The receiver can include radio frequency front-end (RFFE). The RFFE circuitry of the receiver is coupled to an antenna and can include various components, including an analog-to-digital converter (ADC), one or more low noise amplifiers, mixers, local oscillators, or the like. In one embodiment, the receiver includes an external LNA and an internal LNA, where the internal LNA is used in a first power mode and both the external LNA and the internal LNA are used in a second power mode that is higher in power than the first power mode. Collectively, the LNAs can be considered a gain amplifier of the receiver with a first gain value (e.g., where internal LNA turned on) and a second gain value (e.g., where the internal and external LNAs are turned on). A processing device can include baseband circuitry and a CPU, including one or more signal processing blocks to perform some or all of the operations described herein. Also, in some cases the receiver is part of a transceiver.

During operation, the wireless device 600 can establish a wireless link (e.g., Bluetooth® link) (block 602). The receiver can start to receive a data packet via an antenna as part of a transmission over the wireless link. That is, the receiver receives a first RF signal and generates a second RF signal by amplifying, filtering, and down-converting a frequency of the first RF signal. The ADC converts the second RF signal to digital data of the data packet. In another embodiment, the ADC is part of the processing device. The processing device determines whether the data packet is a valid packet (block 610). Before determining whether the data packet is valid at block 610, the processing device configures default power settings to start the transmission (block 604), including configuring settings for baseband circuitry, the RFFE circuitry, and the CPU. The baseband circuitry can include one or more transmit (TX) signal processing blocks, one or more receive (RX) signal processing blocks, a first signal processing block (referred to herein as "an access code detection" signal processing block), or any combination thereof. The first signal processing block can be a dedicated signal processing block that performs operations in connection with access code correlation, as described herein. The first signal processing block can be separated from a TX signal processing block and a RX signal processing block so that power supplied to these separate signal processing blocks can be individually controlled. The processing device, before it starts receiving a data packet in a RX mode, configures the wireless device to operate in a front-end processing (FEP) mode and start a first AGC (block 606) in which only RFFE circuitry and access code detection signal processing block are turned on and all the other baseband circuitry, CPU, and peripheral devices can be powered off. Alternatively, a subset of signal processing blocks is turned on to perform the operations at block 608 before validating the packet at block 610. Therefore, the FEP mode is a low-power mode compared with a full active power mode of the wireless device. The full active power mode is a maximum power mode in which the components operate according to maximum power levels.

In the low-power FEP mode, the processing device is to determine a first gain value for the gain amplifier, such as a gain setting for the internal amplifier. In the low-power FEP mode, the RX signal processing block is able to, using the active blocks, to perform some limited operations. That is, in the FEP mode, the RX signal processing block (a) the processing logic performs an access code synchronization (operation 308); and (b) the processing logic measures a RSSI value (operation 310). At block 610, the RX signal processing block determines whether the data packet is a valid packet. If not, the wireless device 600 remains in the FEP mode, returning to block 606.

When the data packet is a valid packet at block 610, the processing device determines whether the data packet is an EDR packet (block 616). If the data packet is not an EDR packet, the processing device processes a second portion of the data packet as a BR packet (block 618). The processing device demodulates the second portion of the BR packet using GFSK. If the data packet is an EDR packet at block 618, the processing logic determines whether the RSSI value exceeds a threshold value (block 620). When the processing logic exceeds the threshold value, the power adjustment logic makes a power adjustment (block 622) and processes a second portion of the EDR packet (block 624). At block 622, the power adjustment logic can make a power adjustment 626 to the configuration settings at block 604. The processing device demodulates the second portion of the EDR packet using DPSK. When the RSSI value does not exceed the threshold value at block 620, indicating a good packet, the processing device processes the second portion of the EDR packet at block 624 without the power adjustment. At block 610, the received packet is not valid, the RX signal processing block determines that the data packet is either random noise or intended for another receiver. In this case, the wireless device can clear the RX signal processing block and continue with the FEP mode at block 606 until a valid packet is received or a designated time slot is over.

Figure 7:
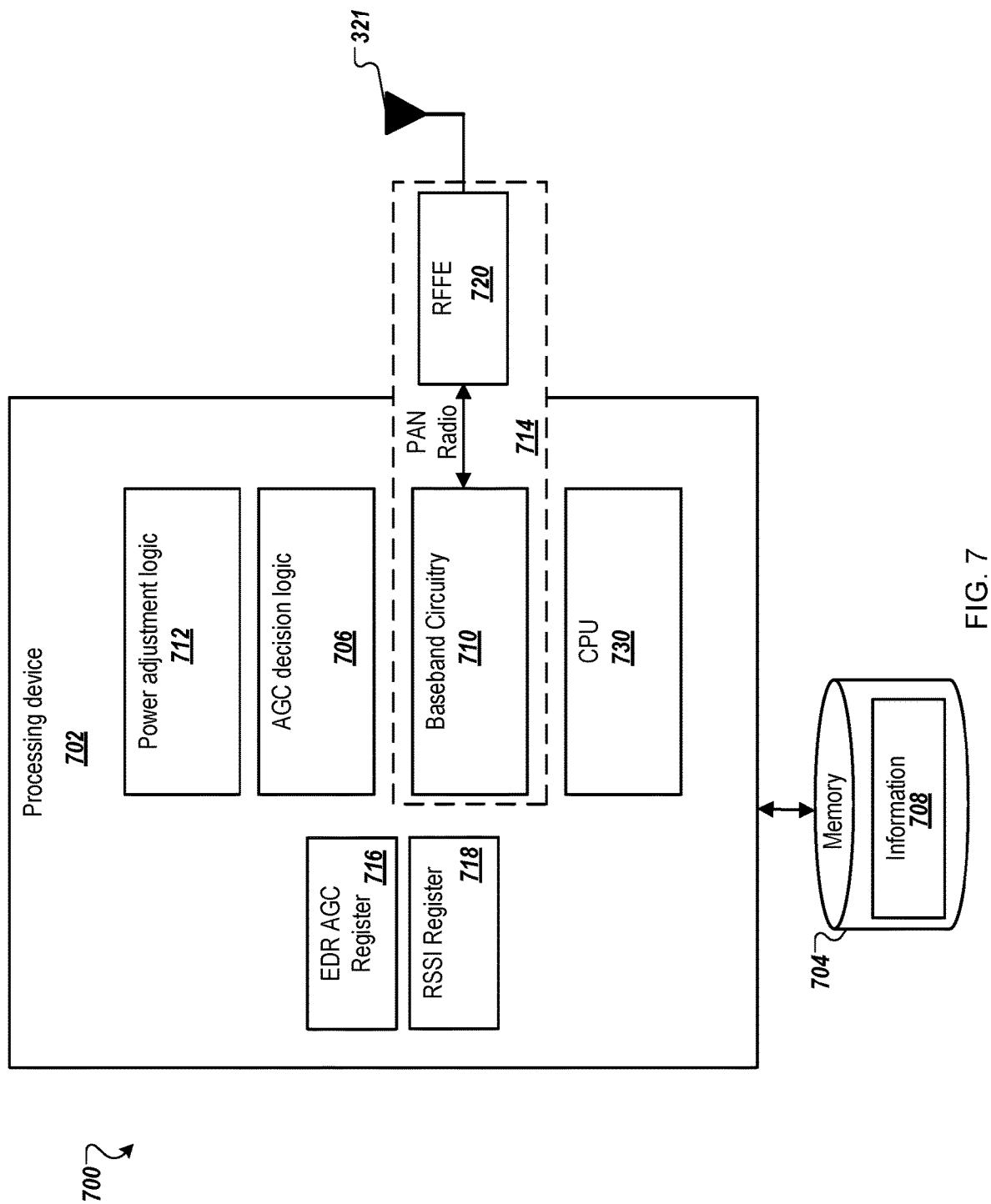
FIG. 7 is a block diagram of a wireless device with AGC decision logic and power adjustment logic according to one embodiment.

FIG. 7 is a block diagram of a wireless device 700 with AGC decision logic 706 and power adjustment logic 712 according to one embodiment. In the depicted embodiment, the wireless device 700 includes radio frequency front-end (RFFE) circuitry 720 that is coupled to one or more antenna(s) 721. The RFFE circuitry 720 can include an ADC that converts RF signals, received via the one or more antennas 721, to digital data for processing one or more packets. The wireless device 700 also includes a memory device 704 and a processing device 702 coupled to the RFFE circuitry 720 and the memory device 704. The processing device 702 includes a radio transceiver 714, such as a personal area network (PAN) radio (e.g., Bluetooth® radio). The radio transceiver 714 can include the RFFE circuitry 720 and baseband logic 710.

As described above with respect to FIG. 1, the processing device 702 can include baseband logic 710 and AGC decision logic 706 and power adjustment logic 712. The CPU 730 establishes a wireless link between the wireless device 700 and a second wireless device via the radio transceiver 714. The CPU 730 adopts a set of default settings to start a transmission on the wireless link. The CPU 730 changes the set of default settings to operate in FEP mode where only the RFFE circuitry 720 (e.g., power amplifier, low noise amplifier (LNA), or the like) and a portion of the baseband logic 710 are powered on. The portion of the baseband logic 710 can include the access code detection signal processing block. Other portions of the baseband logic 710 can include the TX signal processing block, the RX signal processing block and these can be powered off. Furthermore, the CPU 730 or portions of the CPU 730 can be powered off during the FEP mode. The FEP mode is a lower power mode than a full active power mode in which the RFFE circuitry 720, the access code detection signal processing block, the TX signal processing block, the RX signal processing block, and the CPU 730 are powered on and operate at full active power according to the set of default settings.

In the FEP mode, the baseband logic 710 can determine a RSSI value associated with a data packet received over the wireless link. The baseband logic 710 can determine a correlation result by performing an access code correlation on an access code of the incoming data packet with a pre-defined access code. The correlation result can indicate a pattern matter when the incoming data packet is directed to the wireless device 700. From the access code correlation, the baseband logic 710 can determine if the data packet is i) random noise, ii) designated for another wireless device, or iii) designated for this transceiver by the access code correlation result decoding an access code of the data packet. The processing device 700 can store information 708 in the memory device 704. The information 708 can include historical records regarding a wireless link, or the like. The records can be associated with an identifier of a wireless link. The identifier of the wireless link can operate as a key or an index for the records. Alternatively, the CPU 730 can determine the RSSI and store the record in the memory device 704.

The processing device 702 receives a first portion of a first data packet over the wireless link via the PAN receiver, the first portion comprising a packet header that identifies a packet type of the first data packet, and the first portion being modulated using GFSK modulation. The AGC decision logic 706 determines a first gain value for the gain amplifier by performing a first AGC process while the processing device 702 processes the first portion. The power adjustment logic 712 configures the gain amplifier to operate with the first gain value. The power adjustment logic 712 can also put the processing device 702 in a low power mode. The processing device 702 determines a RSSI value associated with the first portion after the gain amplifier is configured to operate with the first gain value. The AGC decision logic 706 determines from the packet type that the first data packet is an enhanced data rate (EDR) packet. The AGC decision logic 706 determines that the RSSI value does not exceed a threshold value, the threshold value corresponding to a defined throughput requirement for the EDR packet. The power adjustment logic 712 switches to a second power mode of the wireless device 700 responsive to the RSSI value not exceeding the threshold value and the first data packet being the EDR packet, the second power mode being higher in power than the first power mode.

In the second power mode, the AGC decision logic 706 determines a second gain value for the gain amplifier by performing a second AGC process during a guard interval between the packet header and a second portion of the first data packet, the second portion including an EDR payload and the second portion being modulated using DPSK modulation. The power adjustment logic 712 configures the gain amplifier to operate with the second gain value. The processing device 702 receives the second portion over the wireless link via the PAN receiver while the gain amplifier is configured to operate with the second gain value. The processing device 702 processes the EDR payload using DPSK modulation.

The power adjustment logic 712 (or logic executed by the CPU 730) is further configured to control the radio transceiver to switch from a first power value in the first power mode to a maximum power level of the radio transceiver in the second power mode, the first power level being less than the maximum power level of the radio transceiver. The power adjustment logic 712 (or logic executed by the CPU 730) is further configured to control the baseband logic 710 to switch from a second power level in the first power mode to a maximum power level of the baseband logic 710 in the second power mode, the second power level being less than the maximum power level of the baseband logic 710. The power adjustment logic 712 (or logic executed by the CPU 730) is further configured to control the CPU 730 to switch from a third power level in the first power mode to a maximum power level of the CPU 730 in the second power mode, the third power level being less than the maximum power level of the CPU 730.

In a further embodiment, the processing device 702 includes multiple registers, including, for example: i) a one-bit flag register 716 (EDR AGC register) for the AGC decision logic 706 to indicate whether the EDR AGC (second AGC) is turned on or off, and ii) a multi-bit register 718 (RSSI register) for the AGC decision logic 706 to read to determine whether EDR AGC is necessary. The processing device 702 can also include a connector, such as a general pin input-output (GPIO). The connector can be connected to an external LNA so that the external LNA can be turned on for the EDR AGC.

The processing device 702 can include a hardware AGC block that leverages the existing common AGC design, but targets for full-gain optimization. The baseband logic 710 can be used to compute the RSSI values. The baseband logic 710 can include a comparison circuit that reads the RSSI register and compares the RSSI value to determine if a second AGC is needed. The processing device 702 (e.g., CPU 730) can execute firmware or software to read, write, or modify the register values for EDR AGC. In one embodiment, the operations described herein are considered a hardware feature where no software intervention is needed.

In one embodiment, the CPU 730 executes firmware, software, or any combination thereof. The software/firmware of the CPU 730 can include a function to read, write, or modify the register values.

In another embodiment, a processing device includes a radio transceiver and baseband circuitry. The radio transceiver is configured to establish a wireless link between the processing device and a second device, the radio transceiver comprising a gain amplifier. The baseband circuitry is configured to configure the radio transceiver and the baseband circuitry to operate in a first power mode. The baseband circuitry receives, in the first power mode, a first portion of a data packet over the wireless link. The baseband circuitry determines, in the first power mode, that the first data packet is an EDR packet including a second portion that is separated by a guard interval between the first portion and the second portion, the second portion including a data payload. The baseband circuitry determines, in the first power mode, a receive signal strength indicator (RSSI) value associated with the first data packet. The baseband circuitry determines that the RSSI does not exceed a threshold value corresponding to a throughput requirement. The baseband circuitry configures the gain amplifier of the wireless device to operate with a second gain value from a first gain value, responsive to a determination that the first data packet is the EDR packet and the RSSI does not exceed the threshold value, the second gain value being higher than the first gain value and the second gain value being associated with a second power mode that is higher in power than the first gain value, the first gain value, the first gain value being associated with the first power mode. The baseband circuitry configures the radio transceiver and the baseband circuitry to operate in the second power mode. The baseband circuitry receives, in in the second power mode, the second portion of the first data packet and processes, in the second power mode, the second portion of the first data packet.

In a further embodiment, the baseband circuitry includes a first modem to demodulate the first portion using a frequency-modulated shift key modulation and a second mode to demodulate the second portion using a phase-modulated shift key modulation.

In a further embodiment, the baseband circuitry is further to demodulate the first portion using GFSK modulation. The baseband circuitry determines that a packet header in the first portion identifies at least one of π/4-DQPSK modulation or 8DPSK modulation for the second portion. The baseband circuitry demodulates the second portion using the at least one of the π/4-DQPSK modulation or the 8DPSK modulation. The baseband circuitry is further configured to establish the wireless link, the first portion including a preamble, an access code, and a packet header. The packet header includes information that identifies a packet type of the first data packet. The baseband circuitry processes, in the first power mode, the preamble, and the access code. The baseband circuitry determines, in the first power mode, the first gain value by performing a first AGC process while processing the preamble. The baseband circuitry is configured to determine the RSSI value before processing the packet header, determine, in the first power mode, that the first data packet is an EDR packet from the packet type identified in the packet header, and determine that the RSSI value does not exceed the threshold value. The baseband circuitry determines the second gain value by performing a second AGC process during the guard interval, responsive to the RSSI value not exceeding the threshold value and the first data packet being an EDR packet.

In a further embodiment, the baseband circuitry is further configured to receive, in the first power mode, a first portion of a second data packet over the wireless link, the first portion of the second data packet including a second preamble, a second access code, and a second packet header. The packet header includes information that identifies a second packet type of the second data packet. The baseband circuitry processes, in the first power mode, the second preamble, and the second access code. The baseband circuitry determines, in the first power mode, a third gain value for the gain amplifier by performing the first AGC process while processing the second preamble, the third gain value corresponding to the first power mode. The baseband circuitry determines, in the first power mode, a second RSSI value associated with the second data packet during processing of the second access code. The baseband circuitry determines, in the first power mode, that the second data packet is a BR packet from the packet type identified in the second packet header. The BR packet has a lower data rate than the EDR packet. The baseband circuitry configures the gain amplifier to continue to operate with the first gain value responsive to the determining that the second data packet is the BR packet. The baseband circuitry receives a second portion of the second data packet over the wireless link while the gain amplifier is configured to operate with the first gain value, the second portion of the second data packet comprising at least a second data payload. The baseband circuitry processes the second data payload.

In another embodiment, the first portion includes an access code and a packet header that is separated by a guard interval, wherein the value or amount of time of the guard interval is in a range between 4.75 microsecond (μs) and 5.25 μs, the second portion including a synchronization sequence, a payload packet header, and the data payload. The baseband circuitry is further configured to: perform a first AGC process while processing the access code, the first AGC process outputting the first gain value; and perform a second AGC process during the guard interval, the second AGC process outputting the second gain value.

In a further embodiment, the baseband circuitry is further configured to receive, in the first power mode, a first portion of a second data packet over the wireless link. The baseband circuitry determines, in the first power mode, that the first data packet is a BR packet from the packet type identified in the second packet header. The baseband circuitry configures the gain amplifier to continue to operate with the first gain value responsive to a determination that the second data packet is the BR packet. The baseband circuitry receives a second portion of the second data packet over the wireless link via the transceiver while the gain amplifier is configured to operate with the first gain value, the second portion of the second data packet comprising at least a data payload and processes the data payload. The baseband circuitry receives, in the second power mode, a second portion of the second data packet, the second portion including at least a second data payload and processes, in the second power mode, the second data payload.

Figure 8:
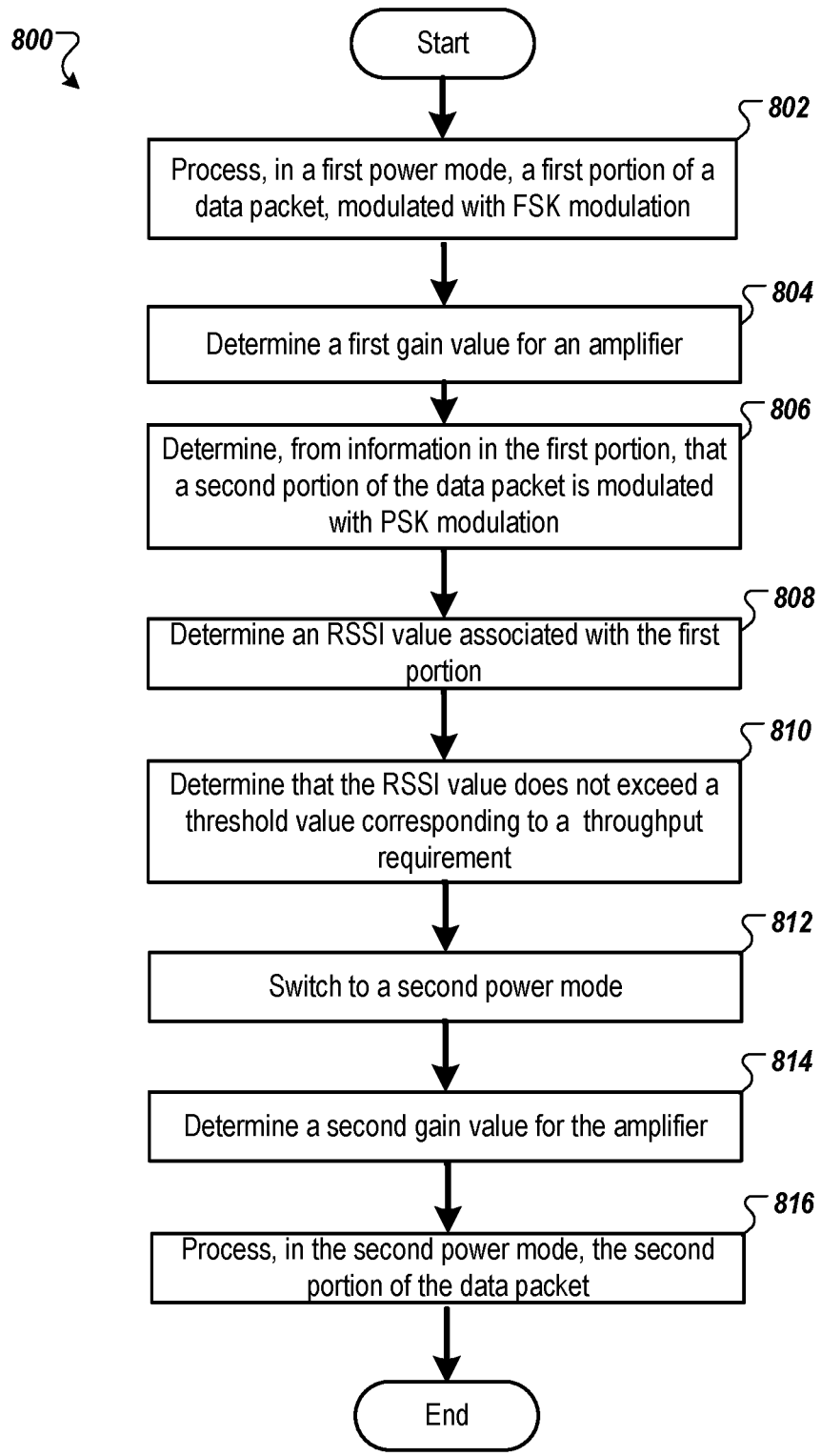
FIG. 8 is a flow diagram of a method of processing a data packet that has a second portion that is modulated with a phase shift key modulation according to one embodiment.

FIG. 8 is a flow diagram of a method of processing a data packet that has a second portion that is modulated with a phase shift key modulation according to one embodiment. The method 800 may be performed by processing logic that comprises hardware (e.g., circuitry, dedicated logic, programmable logic, microcode, etc.), software, firmware, or a combination thereof. In one embodiment, the method 800 may be performed by any of the processing device devices described herein and illustrated with respect to FIGS. 3 and 7.

Referring back to FIG. 8, the method 800 begins by the processing logic processing, in a first power mode of the wireless device, a first portion of a data packet received over a wireless link between the wireless device and a second wireless device, the first portion being modulated with a frequency shift key (FSK) modulation (block 802). The processing logic determines, in the first power mode, a first gain value for an amplifier of the wireless device during the processing the first portion (block 804). The processing logic determines, from information in the first portion, that a second portion of the first data packet is modulated with a phase shift key (PSK) modulation (block 806). The processing logic determines, in the first power mode, a RSSI value associated with the first portion (block 808). The RSSI value can be determined after the first gain value is determined. The processing logic determines that the RSSI does not exceed a threshold value corresponding to a throughput requirement (block 810). The processing logic switches to a second power mode of the wireless device responsive to the RSSI value not exceeding the threshold value and the second portion is modulated with the PSK modulation (block 812). The second power mode is higher in power than the first power mode. At block 812, the processing logic can configure the amplifier to operate with a second gain value. The second gain value can be associated with the second power mode. The processing logic determines, in the second power mode, a second gain value for the amplifier of the wireless device (block 814). The processing logic processes, in the second mode, the second portion of the first data packet (block 816); and the method 800 ends. It should be noted that the second gain value is determined before the processing the second portion at block 816.

In another embodiment, the processing logic determines, at block 806, whether the data packet has a data payload that is modulated at a first data rate or that is modulated at a second data rate that is higher than the first data rate. In another embodiment, the processing logic determines, at block 806, a packet type for the first data packet from the first portion. The packet type identifies the first data packet as having a data payload that is modulated with a second shift key modulation that has a higher data rate than the first shift key modulation. In another embodiment, the processing logic determines, at block 806, whether the data packet has a data payload that is modulated at a first data rate or that is modulated at a second data rate that is higher than the first data rate. In another embodiment, the processing logic determines, at block 806, that the data packet is a first packet type with a data payload that is modulated at a first data rate or that the data packet is a second packet type with a data payload that is modulated at a second data rate that is higher than the first data rate. In another embodiment, the processing logic determines, at block 806, that the data packet is an EDR packet with a second portion that is separated from the first portion by a guard interval, the second portion comprising a data payload.

In a further embodiment, the processing logic processes the first portion at block 802 by demodulating the first portion using GFSK modulation. The processing logic at block 806 determines that a packet header in the first portion identifies differential quadrature phase shift key ($\pi/4$-DQPSK) modulation for the second portion and processes the second portion by demodulating the second portion using the $\pi/4$-DQPSK modulation. In another embodiment, the processing logic the processing logic processes the first portion at block 802 by demodulating the first portion using GFSK modulation. The processing logic at block 806 determines that a packet header in the first portion identifies differential eight phase shift key (8DPSK) modulation for the second portion and processes the second portion by demodulating the second portion using the 8DPSK modulation.

In a further embodiment, the processing logic establishes the wireless link. The processing logic receives the first portion, the first portion including a preamble, an access code, and a packet header comprising information that identifies a packet type of the first data packet. The processing logic at block 802 processes the preamble, the access code, and the packet header. The processing logic at block 804 determines the first gain value by performing a first AGC process during the processing of the preamble at block 802. The processing logic determines the RSSI value at block 808 during the processing of the access code at block 802. The processing logic at block 806 determines a packet type for the first data packet from the packet header, the packet type identifying the first data packet as an EDR packet. The processing logic determines the second gain value at block 814 by performing a second AGC process during a guard interval in between the first portion and the second portion, responsive to the RSSI value not exceeding the threshold value and the first data packet being the EDR packet.

In a further embodiment, the processing logic processes, in the first power mode, a first portion of a second data packet received over the wireless link and determines a third gain value for the amplifier during the processing the first portion of the second data packet. The processing logic determines, from information in the first portion of the second data packet, that a second portion of the second data packet is modulated with the FSK modulation. The processing logic configures the amplifier to continue to operate with the third gain value responsive to the second portion being modulated with the FSK modulation. The processing logic receives the second portion of the second data packet over the wireless link while the amplifier is configured to operate with the third gain value, the second portion of the second data packet. The processing logic processes the second portion of the second data packet.

In a further embodiment, the processing logic processes the first portion of the second data packet comprises demodulating the first portion using GFSK modulation. The processing logic determines that the second portion is modulated with the FSK modulation comprises determining that a packet header of the second data packet specifies that the second data packet is a BR packet. The processing logic processes the second portion comprises demodulating the second portion using the GFSK modulation.

In a further embodiment, the processing logic receives the first portion of the second data packet, the first portion of the second data packet comprising a preamble, an access code, and the packet header. The processing logic processes the first portion comprises processing the preamble, the access code, and the packet header. The processing logic determines the third gain value by performing a first AGC process during the processing of the preamble.

In a further embodiment, the first portion includes an access code and a packet header and the second portion includes a synchronization sequence and a data payload. The first data packet includes a value indicative of a guard interval between the first portion and the second portion. The value of the guard interval can be in a range between 4.75 microsecond (µs) and 5.25 µs. In one embodiment, the processing logic determines the first gain value by performing a first AGC process during the processing of the preamble and determines the second gain value by performing a second AGC process during the guard interval.

Figure 9:
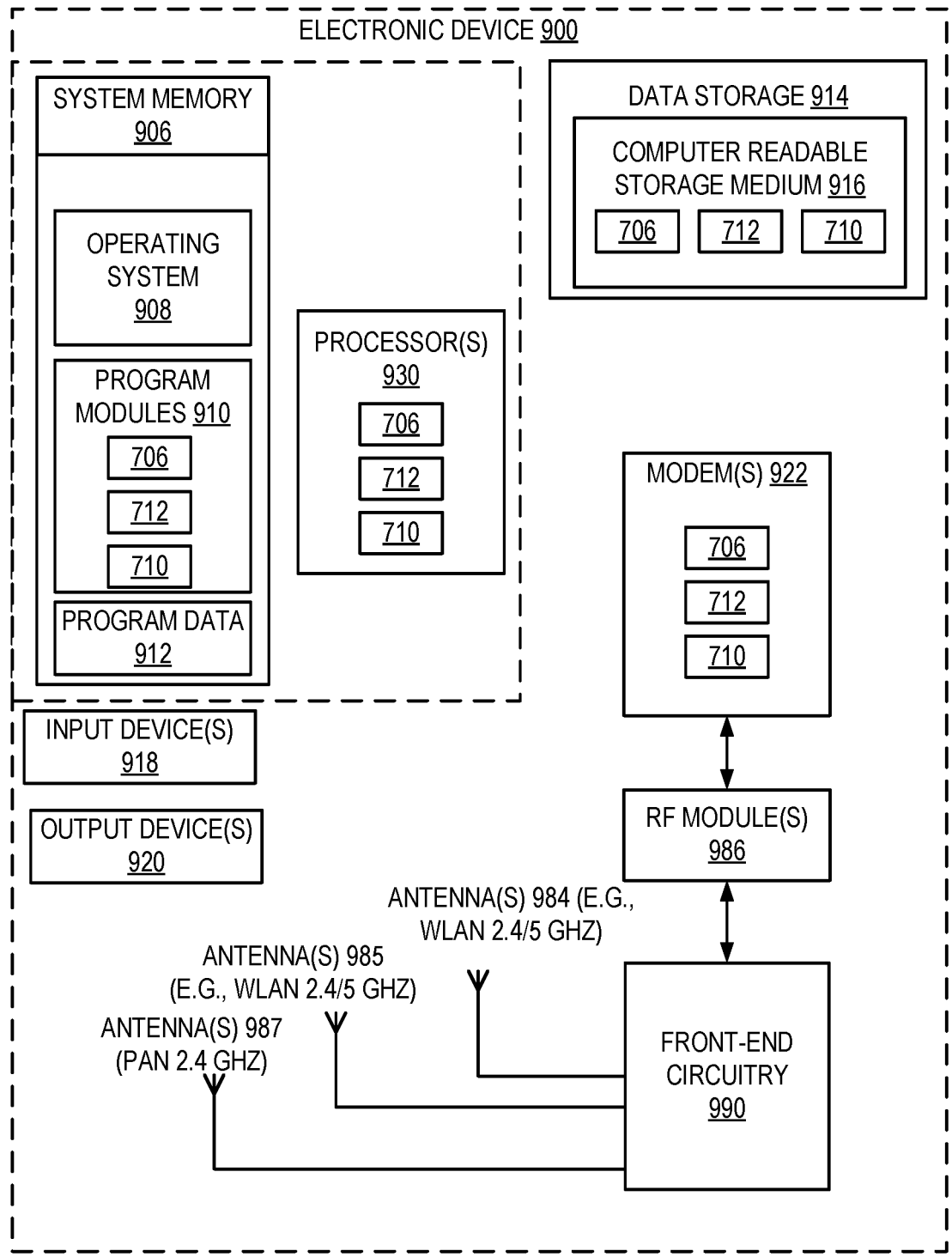
FIG. 9 is a block diagram of an electronic device that can be configured to categorize and adjust power modes as described herein according to one embodiment.

FIG. 9 is a block diagram of an electronic device 900 that can be configured to categorize and adjust power modes as described herein according to one embodiment. The electronic device 900 may correspond to the electronic devices described above with respect to FIGS. 1-8. In one embodiment, the electronic device 900 is the wireless device described above with respect to FIGS. 3-6. In another embodiment, the electronic device 900 is the wireless device 700 of FIG. 7. Alternatively, the electronic device 900 may be other electronic devices, as described herein.

The electronic device 900 includes one or more processor(s) 930, such as one or more CPUs, microcontrollers, field programmable gate arrays, or other types of processors. The electronic device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the electronic device 900. The electronic device 900 performs functions by using the processor(s) 930 to execute instructions provided by the system memory 906. In one embodiment, the program modules 910 may include AGC decision logic 706 and power adjustment logic 712 that may perform some or all of the operations described herein, such as the method 300 of FIG. 3, the algorithm 500 of FIG. 5, the method 600 of FIG. 6, the method 800 of FIG. 8, or any processes described herein. The AGC decision logic 706 and power adjustment logic 712 may perform some or all of the operations described herein. The program modules 910 may also include the baseband logic 710 that perform similar operations as the baseband circuitry described herein.

The electronic device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 (e.g., AGC decision logic 706, power adjustment logic 712, baseband logic 710, or any combination thereof) may reside, completely or at least partially, within the computer-readable storage medium 916, system memory 906 and/or within the processor(s) 930 during execution thereof by the electronic device 900, the system memory 906 and the processor(s) 930 also constituting computer-readable media. The electronic device 900 may also include one or more input devices 918 (keyboard, mouse device, specialized selection keys, etc.) and one or more output devices 920 (displays, printers, audio output mechanisms, etc.).

The electronic device 900 further includes a modem 922 to allow the electronic device 900 to communicate via a wireless connections (e.g., such as provided by the wireless communication system) with other computing devices, such as remote computers, an item providing system, and so forth. The modem 922 can be connected to one or more radio frequency (RF) modules 986. The RF modules 986 may be a WLAN module, a WAN module, wireless personal area network (WPAN) module, Global Positioning System (GPS) module, or the like. The antenna structures (antenna(s) 984, 985, 987) are coupled to the front-end circuitry 990, which is coupled to the modem 1022. The front-end circuitry 990 may include radio front-end circuitry, antenna switching circuitry, impedance matching circuitry, or the like. The antennas 984 may be GPS antennas, Near-Field Communication (NFC) antennas, other WAN antennas, WLAN or PAN antennas, or the like. The modem 922 allows the electronic device 900 to handle both voice and non-voice communications (such as communications for text messages, multimedia messages, media downloads, web browsing, etc.) with a wireless communication system. The modem 922 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via front-end circuitry 990, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the electronic device 900 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 922 is shown to control transmission and reception via antenna (984, 985, 987), the electronic device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
a personal area network (PAN) receiver comprising a gain amplifier; and
a central processing unit (CPU) coupled to the PAN receiver, wherein the CPU:
establishes a wireless link between the wireless device and a second wireless device;
in a first power mode of the wireless device,
receives a first portion of a first data packet over the wireless link via the PAN receiver, the first portion comprising a packet header that identifies a packet type of the first data packet, and the first portion being modulated using Gaussian Frequency Shift Key (GFSK) modulation;
determines a first gain value for the gain amplifier;
configures the gain amplifier to operate with the first gain value;
determines a received signal strength indicator (RSSI) value associated with the first portion after the gain amplifier is configured to operate with the first gain value;
determines from the packet type that the first data packet is an enhanced data rate (EDR) packet;
determines that the RSSI value does not exceed a threshold value, the threshold value corresponding to a defined throughput requirement for the EDR packet; and
switches to a second power mode in which the wireless device consumes more power than in the first power mode; and
in the second power mode,
configures the gain amplifier to operate with a second gain value during an interval after receiving the packet header, the second gain value being higher than the first gain value;
receives a second portion of the first data packet over the wireless link via the PAN receiver while the gain amplifier is configured to operate with the second gain value, the second portion comprising an EDR payload and the second portion being modulated using Differential Phase Shift Key (DPSK) modulation; and
processes the EDR payload.

2. The wireless device of claim 1, wherein the PAN receiver comprises a first modem and a second modem, wherein the first modem demodulates the first portion using GFSK modulation, wherein the second modem demodulates the second portion using either differential quadrature phase shift key (π/4-DQPSK) modulation or differential 8PSK modulation.

3. The wireless device of claim 1, wherein the CPU further:
in the first power mode,
receives a first portion of a second data packet over the wireless link via the PAN receiver, the first portion of the second data packet comprising a packet header that identifies a packet type of the second data packet, and the first portion of the second data packet being modulated using GFSK modulation;
determines a third gain value for the gain amplifier;
configures the gain amplifier to operate with the third gain value;
determines a second RSSI value associated with the first portion of the second data packet after the gain amplifier is configured to operate with the third gain value;
determines from the packet type that the second data packet is a basic rate (BR) packet, the BR packet having a lower data rate than the EDR packet;
determines that the RSSI value does not exceed the threshold value; and
configures the gain amplifier to continue to operate with the third gain value responsive to a determination that the second data packet is the BR packet;
receives a second portion of the second data packet over the wireless link via the PAN receiver while the gain amplifier is configured to operate with the third gain value, the second portion of the second data packet comprising a BR payload and the second portion of the second data packet being modulated using GFSK; and
processes the BR payload.

4. A method comprising:
processing, by a wireless device in a first power mode of the wireless device, a first portion of a first data packet received over a wireless link between the wireless device and a second wireless device, the first portion being modulated with a frequency shift key (FSK) modulation;
determining, by the wireless device in the first power mode, a first gain value for an amplifier of the wireless device;
determining, by the wireless device in the first power mode from information in the first portion, that the first data packet has a second portion that is modulated with a phase shift key (PSK) modulation;
determining, by the wireless device in the first power mode, a receive signal strength indicator (RSSI) value associated with the first portion;
determining, by the wireless device, that the RSSI value does not exceed a threshold value, the threshold value corresponding to a throughput requirement;
switching to a second power mode of the wireless device in which the wireless device consumes more power than in the first power mode;
configuring, by the wireless device in the second power mode, the amplifier to operate at a second gain value that is higher than the first gain value; and
processing, by the wireless device in the second power mode, the second portion of the first data packet using the second gain value.

5. The method of claim 4, wherein:
processing the first portion comprises demodulating the first portion using Gaussian Frequency Shift Key (GFSK) modulation,
determining that the second portion is modulated with the PSK modulation comprises determining that a packet header in the first portion identifies differential quadrature phase shift key (π/4-DQPSK) modulation or differential eight phase shift key (8DPSK) modulation for the second portion; and
processing the second portion comprises demodulating the second portion using the π/4-DQPSK modulation or the 8DPSK modulation.

6. The method of claim 4, further comprising:
establishing, by the wireless device, the wireless link;
receiving the first portion, the first portion comprising a preamble, an access code, and a packet header comprising information that identifies a packet type of the first data packet, wherein:
processing the first portion comprises processing the preamble, the access code, and the packet header;
determining the first gain value comprises determining the first gain value during processing of the preamble;
determining the RSSI value comprises determining the RSSI value during processing of the access code;
determining that the second portion is modulated with the PSK modulation comprises determining a packet type for the first data packet from the packet header, wherein the packet type identifies the first data packet as an enhanced data rate (EDR) packet; and
configuring the amplifier to operate with second gain level comprises configuring the amplifier to operate with the second gain level during an interval after receiving the first portion.

7. The method of claim 4, further comprising:
processing, by the wireless device in the first power mode, a first portion of a second data packet received over the wireless link;
determining, by the wireless device in the first power mode, a third gain value for the amplifier during processing the first portion of the second data packet;
determining, by the wireless device in the first power mode from information in the first portion of the second data packet, that the second data packet has a second portion that is modulated with the FSK modulation;
configuring the amplifier to continue to operate with the third gain value;
receiving the second portion of the second data packet over the wireless link while the amplifier is configured to operate with the third gain value, the second portion of the second data packet; and
processing the second portion of the second data packet.

8. The method of claim 7, wherein:
processing the first portion of the second data packet comprises demodulating the first portion using Gaussian Frequency Shift Key (GFSK) modulation;
determining that the second portion is modulated with the FSK modulation comprises determining that a packet header of the second data packet specifies that the second data packet is a basic rate (BR) packet; and
processing the second portion comprises demodulating the second portion using the GFSK modulation.

9. The method of claim 4, further comprising:
receiving a first portion of a second data packet, the first portion of the second data packet comprising a preamble, an access code, and a packet header;
processing the preamble, the access code, and the packet header; and
determining a third gain value for the amplifier during processing of the preamble.

10. The method of claim 4, wherein:
the first portion comprises an access code and a packet header,
the second portion comprises a synchronization sequence and a data payload,
the first data packet comprises a value indicative of an interval between the first portion and the second portion, the value being in a range between 4.75 microsecond (µs) and 5.25 µs, and
the method further comprises:
   determining the first gain value comprises determining the first gain value during processing of the access code; and
   configuring the amplifier to operate with the second gain value comprises configuring the amplifier to operate with the second gain value during the interval.

11. A method comprising:
processing, by a wireless device in a first power mode of the wireless device, a first portion of a first data packet received over a wireless link between the wireless device and a second wireless device, the first portion being modulated with a first shift key modulation;
determining, by the wireless device in the first power mode, a first gain value for an amplifier of the wireless device;
determining, by the wireless device in the first power mode, a packet type for the first data packet from the first portion, wherein the packet type identifies the first data packet as having a data payload that is modulated with a second shift key modulation that has a higher data rate than the first shift key modulation;
determining, by the wireless device in the first power mode, a receive signal strength indicator (RSSI) value associated with the first portion;
determining, by the wireless device, that the RSSI does not exceed a threshold value corresponding to a throughput requirement;
switching to a second power mode of the wireless device in which the wireless device consumes more power than in the first power mode;
configuring, by the wireless device in the second power mode, the amplifier to operate at a second gain value that is higher than the first gain value; and
processing, by the wireless device in the second power mode, a second portion of the first data packet using the second gain value.

12. The method of claim 11, wherein:
processing the first portion comprises demodulating the first portion using Gaussian Frequency Shift Key (GFSK) modulation,
determining the packet type comprises determining that a packet header in the first portion identifies differential quadrature phase shift key (π/4-DQPSK) modulation for the second portion; and
processing the second portion comprises demodulating the second portion using the π/4-DQPSK modulation.

13. The method of claim 11, wherein:
processing the first portion comprises demodulating the first portion using Gaussian Frequency Shift Key (GFSK) modulation,
determining the packet type comprises determining that a packet header in the first portion identifies differential eight phase shift key (8DPSK) modulation for the second portion; and
processing the second portion comprises demodulating the second portion using the 8DPSK modulation.

14. The method of claim 11, further comprising:
establishing, by the wireless device, the wireless link;
receiving the first portion, the first portion comprising a preamble, an access code, and a packet header comprising information that identifies a packet type of the first data packet, wherein:
processing the first portion comprises processing the preamble, the access code, and the packet header;
determining the first gain value comprises determining the first gain value during processing of the preamble;
determining the RSSI value comprises determining the RSSI value during processing of the access code; and
determining the packet type comprises determining from information in the packet header that the packet type is an enhanced data rate (EDR) packet; and
configuring the amplifier to operate with second gain level comprises configuring the amplifier to operate with the second gain level during an interval after receiving the first portion.

15. The method of claim 11, further comprising:
processing, by the wireless device in the first power mode, a first portion of a second data packet received over the wireless link;
determining, by the wireless device in the first power mode, a third gain value for the amplifier during processing the first portion of the second data packet;
determining, by the wireless device in the first power mode, a packet type for the second data packet from the first portion of the second data packet, wherein the packet type of the second data packet identifies the second portion as being modulated with the first shift key modulation;
configuring the amplifier to continue to operate with the third gain value;
receiving the second portion of the second data packet over the wireless link while the amplifier is configured to operate with the third gain value, the second portion of the second data packet; and
processing the second portion of the second data packet.

16. The method of claim 15, wherein:
processing the first portion of the second data packet comprises demodulating the first portion using Gaussian Frequency Shift Key (GFSK) modulation;
determining the packet type for the second data packet comprises determining that a packet header of the second data packet specifies that the second data packet is a basic rate (BR) packet; and
processing the second portion comprises demodulating the second portion using the GFSK modulation.

17. The method of claim 11, further comprising:
receiving a first portion of a second data packet, the first portion of the second data packet comprising a preamble, an access code, and a packet header;

processing the preamble, the access code, and the packet header; and determining a third gain value for the amplifier during processing of the preamble.

18. The method of claim 11, wherein:

the first portion comprises a preamble, an access code, and a packet header, the second portion comprises a synchronization sequence and a data payload, wherein the first data packet comprises a value indicative of an interval between the first portion and the second portion, the value being in a range between 4.75 microsecond (µs) and 5.25 µs, and the method further comprises:

determining the first gain value comprises determining the first gain value during processing of the preamble; and configuring the amplifier to operate with the second gain value comprises configuring the amplifier to operate with the second gain value during the interval.

19. The method of claim 11, wherein the first shift key modulation is a frequency shift key modulation, and wherein the second shift key modulation is a phase shift key modulation.

20. The method of claim 11, further comprising:

receiving a first second portion of a second data packet over the wireless link while the amplifier is configured to operate with a third gain value;

processing the first portion of the second data packet by demodulating the first portion using Gaussian Frequency Shift Key (GFSK) modulation;

determining that a second portion of the second data packet is modulated with the GFSK modulation;

configuring the amplifier to continue to operate with the third gain value; and processing the second portion of the second data packet by demodulating the second portion using the GFSK modulation.

* * * * *